(12) United States Patent
Siu

(10) Patent No.: US 9,166,952 B2
(45) Date of Patent: Oct. 20, 2015

(54) SECURITY DEVICE BANK AND A SYSTEM INCLUDING THE AND SD SECURITY DEVICE BANK

(71) Applicant: Joseph Siu, Markham (CA)

(72) Inventor: Joseph Siu, Markham (CA)

(73) Assignee: Thales Canada Inc, Toronto, Ontario (CA)

( * ) Notice: Subject to any disclaimer, the term of this patent is extended or adjusted under 35 U.S.C. 154(b) by 0 days.

(21) Appl. No.: 13/837,012

(22) Filed: Mar. 15, 2013

(65) Prior Publication Data
US 2014/0109214 A1 Apr. 17, 2014

Related U.S. Application Data

(60) Provisional application No. 61/714,202, filed on Oct. 15, 2012.

(51) Int. Cl.
| H04L 29/06 | (2006.01) |
| H04L 12/46 | (2006.01) |
| B61L 3/00 | (2006.01) |
| B61L 15/00 | (2006.01) |
| B61L 27/00 | (2006.01) |

(52) U.S. Cl.
CPC ................. *H04L 63/029* (2013.01); *B61L 3/00* (2013.01); *B61L 15/0027* (2013.01); *B61L 27/0005* (2013.01); *H04L 12/4641* (2013.01); *H04L 63/02* (2013.01); *H04L 63/0272* (2013.01); *H04L 63/0471* (2013.01); *H04L 63/164* (2013.01)

(58) Field of Classification Search
CPC ...... H04L 12/4641; H04L 63/029; B61L 3/00
USPC ........................................................... 726/15
See application file for complete search history.

(56) References Cited

U.S. PATENT DOCUMENTS

| 5,680,116 A | * 10/1997 | Hashimoto et al. ........... 370/254 |
| 6,337,854 B1 | 1/2002 | Papini et al. |
| 6,496,702 B1 | 12/2002 | Lockhart |
| 6,987,977 B2 | 1/2006 | Lockhart |
| 6,996,630 B1 | 2/2006 | Masaki et al. |
| 7,263,372 B2 | 8/2007 | Lockhart |

(Continued)

FOREIGN PATENT DOCUMENTS

| WO | 00/52851 | 9/2000 |
| WO | 2007067193 | 6/2007 |

OTHER PUBLICATIONS

Lloret et al., "A fault-tolerant protocol for railway control systems", 2006, pp. 310-317.*

(Continued)

*Primary Examiner* — Mohammad L Rahman
*Assistant Examiner* — Thaddeus Plecha
(74) *Attorney, Agent, or Firm* — Hauptman Ham, LLP

(57) ABSTRACT

In some embodiments, a system includes a trusted network, an untrusted network, on-board equipment on-board a moving object, one or more first security devices on-board the moving object and communicatively connecting the on-board equipment and the untrusted network, and a security device bank communicatively connecting the trusted network and the untrusted network. The security device bank includes a common bus or the local network and one or more second security devices connected to the common bus or the local network.

20 Claims, 5 Drawing Sheets

(56) References Cited

U.S. PATENT DOCUMENTS

| | | |
|---|---|---|
| 7,505,473 B2 | 3/2009 | Paavolainen |
| 7,561,887 B2 | 7/2009 | Lockhart |
| 7,792,072 B2 | 9/2010 | Devarapalli et al. |
| 7,860,978 B2 | 12/2010 | Oba et al. |
| 7,882,247 B2 | 2/2011 | Sturniolo et al. |
| 7,929,978 B2 | 4/2011 | Lockhart |
| 2003/0125048 A1 | 7/2003 | Lockhart |
| 2006/0079250 A1 | 4/2006 | Lockhart |
| 2007/0157307 A1 | 7/2007 | Katoh et al. |
| 2007/0213073 A1 | 9/2007 | Lockhart |
| 2007/0266236 A1 | 11/2007 | Colditz et al. |
| 2008/0298312 A1* | 12/2008 | Zhang et al. .................. 370/328 |
| 2008/0315044 A1* | 12/2008 | Stull et al. .......................... 246/5 |
| 2009/0227267 A1 | 9/2009 | Lockhart |
| 2009/0248463 A1 | 10/2009 | Piochon et al. |
| 2009/0265767 A1 | 10/2009 | Rune et al. |
| 2009/0292816 A1 | 11/2009 | Etchegoyen et al. |
| 2010/0064133 A1 | 3/2010 | Martin et al. |
| 2010/0250292 A1 | 9/2010 | Wurster et al. |
| 2010/0325424 A1 | 12/2010 | Etchegoyen et al. |
| 2012/0210416 A1* | 8/2012 | Mihelich et al. ................. 726/11 |
| 2012/0248261 A1* | 10/2012 | Nichter ......................... 246/125 |

OTHER PUBLICATIONS

Hartong et al., Trust-Based Secure Positive Train Control (PTC) Interoperation, 2006, <http://cs.gmu.edu/~tr-admin/papers/ISE-TR-06-10.pdf>.

International Search Report and Written Opinion for corresponding International Application No. PCT/IB2013/002289, dated Feb. 27, 2014.

Bantin et al., "Designing a secure data communications system for automatic train control," Proceedings of the Institution of Mechanical Engineers, Part F: Journal of Rail and Rapid Transit, vol. 225, No. 4 pp. 395-402, Jul. 2011.

Ho et al., "Information Raining and Optimal Link-Layer Design for Mobile Hotspots," IEEE Transactions on Mobile Computing, vol. 4, No. 3, Jun. 2005.

Hartong, "Secure Communication Based Train Control (CBTC) Operations," George Mason University, 2009.

\* cited by examiner

SECURITY DEVICE BANK AND A SYSTEM INCLUDING THE AND SD SECURITY DEVICE BANK

BACKGROUND

An urban rail communication-based train control (CBTC) system is responsible for the safe and efficient control of the trains. An advantage of a CBTC system is that increased reliability and closer spacing between trains is achievable during train operations. In a CBTC system, automatic train operation, protection, and supervision are often provided by central computers. These computers are responsible for the efficient routing of the trains and protection the trains from collision with other trains and derailing due to misaligned points (rail switches). The computer equipment on-board a train is directly responsible for adhering to the movement authority limits established by the control computers, reporting the position of the train, and for safely controlling the train propulsion system and the passenger doors. The components of the CBTC system are interconnected through a data communication system (DCS). The DCS must ensure that there is sufficient security in place to allow the safe, efficient operation of the CBTC system.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
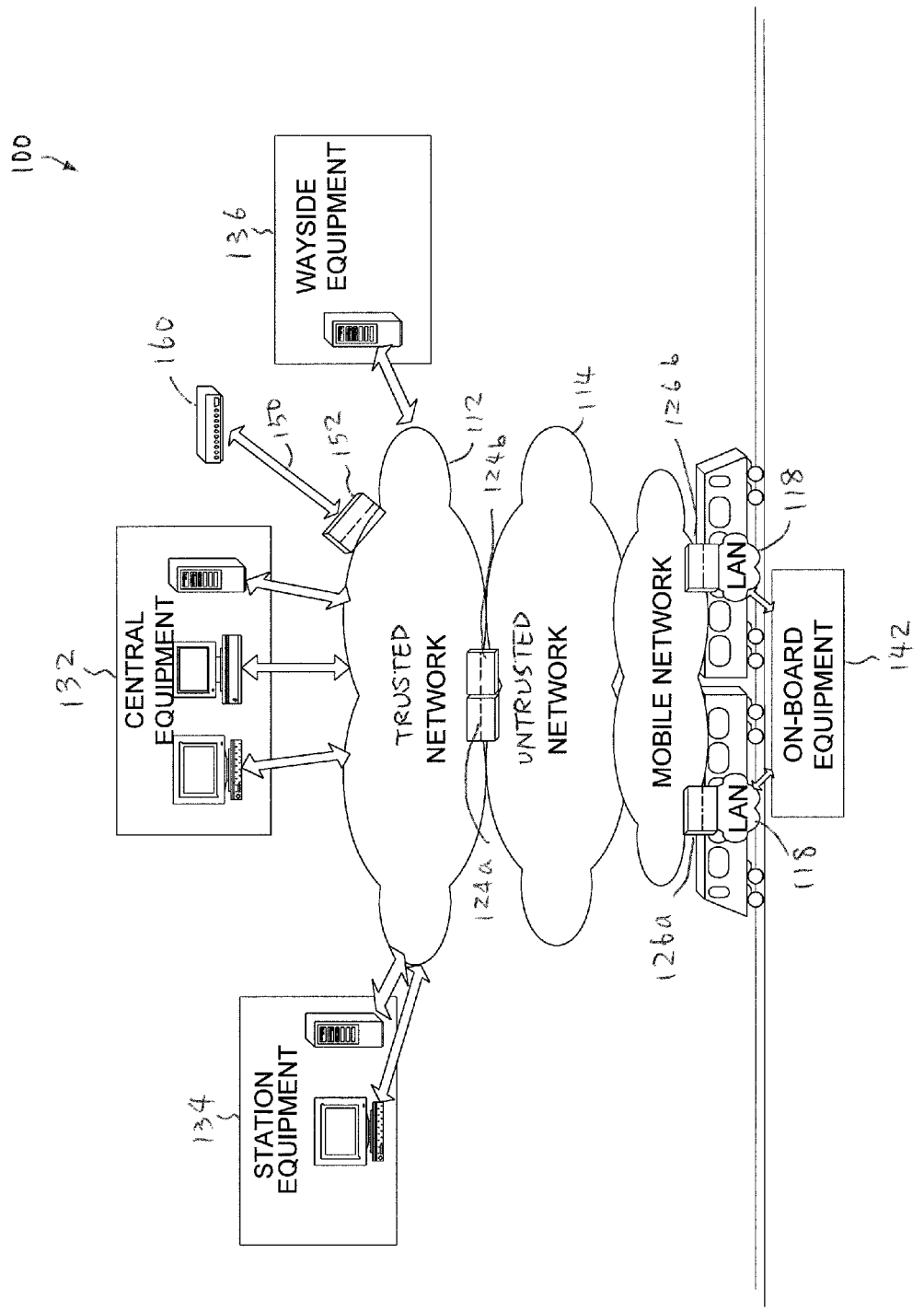
FIG. 1 is a system diagram of a CBTC system in accordance with one or more embodiments.

It is understood that the following disclosure provides one or more different embodiments, or examples, for implementing different features of the disclosure. Specific examples of components and arrangements are described below to simplify the present disclosure. These are, of course, examples and are not intended to be limiting. In accordance with the standard practice in the industry, various features in the drawings are not drawn to scale and are used for illustration purposes only.

FIG. 1 is a system diagram of a CBTC system 100 in accordance with one or more embodiments. The CBTC system 100 has a data communication system (DCS), which includes a trusted fiber optic network 112, an untrusted fiber optic network 114, a radio-based train-to-wayside mobile communication network 116, local area networks 118 on board a train, a set of security device (SD) Banks 124*a* and 124*b* coupling the trusted fiber optic network 112 and the untrusted fiber optic network 114, and a set of security device (SDs) 126*a* and 126*b* coupling the mobile communication network 116 and the local area networks 118 on board the train. The DCS also optionally has a connection 150 to an external network 160 via a SD Bank 152. The untrusted fiber optic network 114 and the wayside mobile communication network 116 are also collectively referred to as an untrusted network. In some embodiments, the trusted fiber optic network 112 and the untrusted fiber optic network 114 are not fiber optic networks. In some embodiments, the trusted network 112 and the untrusted network 114 are implemented by wired communication technology, wireless communication technology, optical communication technology, or a combination thereof.

In accordance with the level of protection required for the trusted network 112, the individual components of the DCS network equipment and their interconnections are classified as being either trusted or untrusted. A trusted component is one from which any message originated in the component can be accepted and acted upon by another trusted component with absolute assurance that it is genuine and intended. An untrusted component, on the other hand, is one from which any message originated in the component must be assumed to be false, as far as the CBTC system is concerned, and cannot be allowed to influence either the operation or safety of the system. A trusted network, such as trust network 112, includes only trusted components, and a trusted component of a trusted network must never connects directly to an untrusted component unless it is through an equipment designed to provide a sufficient defense. Otherwise, other interconnections among other components are presumably an untrusted network.

The CBTC system 100 further has central equipment 132, station equipment 134, and wayside equipment 136 coupled to the trusted fiber optic network 112 of the DCS. The CBTC system 100 also has on-board equipment 142 connected to the local area networks 118 on board the train. The SD Banks 124*a*, 124*b*, and 152 each include multiple SDs as communication gateway between the untrusted mobile network 116 and the trusted network 112 and the equipment connected thereto. In some embodiments, the SD Bank 124*a* or 124*b* only includes one physical security device.

Security devices (SDs) are used to protect data communication through an untrusted open network. The SDs provide a strong authentication function to protect against a masquerading attack. At the equipment side, instead of deploying SDs at the end nodes and establishing tunnels between the end nodes and the SD 126*a* or 126*b* on-board the train through both trusted network 112 and untrusted network 114, in the embodiment depicted in FIG. 1, the SDs are grouped into SD Banks 124*a*, 124*b*, and 152 and deployed at the nodes that bridge trusted network 112 and the untrusted fiber optic network 114. In some embodiments, the tunnels are also referred to as virtual private network (VPN) tunnels. In some embodiments, the VPN tunnels are in compliance with an INTERNET ENGINEERING TASK FORCE (IETF) INTERNET PROTOCOL SECURITY (IPsec) standard.

In some embodiments, the SD Banks 124*a* and/or 124*b* establish and maintain communication tunnels with both the SDs 126*a* and 126*b* on board to provide alternative or redundant communication paths as a safeguard. A communication tunnel refers to a trusted connection set up through a pair of SDs that has shared the necessary secret information to manage communication in between based on a cryptographic process. The failure management is handled by the route tracing of the SD Banks 124*a* and 124*b* and the SDs 126*a* and 126*b* on-board the train.

Each of the physical SD in the SD Bank 124a, 124b, and/or 152 are capable of handling a predefined number of tunnels, allowing scaling of the system by adding the number of physical SDs to the SD Bank as the number of trains or the needs for communication capacity increases. The number of tunnels available for each train thus is kept constant regardless of the number of wayside equipment in the system. In at least some embodiments, this resolves the problem of scalability with the existing solution.

The implementation of the SD Bank 124a, 124b, and 152 is performed by using an embedded device designed to be qualified under railway environmental standards. In at least some embodiments, the SD in a SD Bank is loaded with an open source operating system with a freely distributed IPSec module. The configuration file is modified to be tailored to the solution as indicated above On the physical level, the train devices (collectively referred to as the on-board equipment 142) connect to the train security devices through the LAN 118 using standard Ethernet interfaces (Cat-5, M12, or LEMO). In some embodiments, the LAN 118 is also referred to as part of the on-board equipment 142. In some embodiments, the LAN 118 is omitted. The train SD then connects to an on-board mobile radio of the mobile network 116 through Ethernet interface that communicates with the wayside radio units of the mobile network 116 through standard wireless protocol, e.g., IEEE 802.11. The wayside radio unit then connects using a wired connection, e.g., 100-Base-FX, to the untrusted network 114. In some embodiments, SD Bank 124a or 124b are also connected to the untrusted fiber optic network 114 through a 100-Base-TX interface, and to a router of the trusted network 112 through another 100-base-tx interface. The trusted network router then connects to the wayside devices (i.e., the central equipment 132, the station equipment 134, and the wayside equipment 136) using 100-Base-Tx interface.

On the logical level, the train device and the trusted SD interface of a train SD 126a or 126b belong to the same Virtual Local Area Network (VLAN) as the train network. The untrusted train SD interface of a train SD 126a or 126b and the untrusted wayside SD interface of a SD of SD Bank 124a or 124b belong to the same VLAN as the untrusted wireless network. The trusted SD interface of a SD of SD Bank 124a or 124b and the network router interface share the same VLAN. The data traffic is then routed based on the destination(s) thereof, where each destination have separate VLANs in some embodiments.

On the routed level, the entire design according to at least one embodiment is based on static routing to achieve deterministic failure mode. The update of the route metric is performed through route metric mechanisms in the trusted network router and SD Banks 124a or 124b. The trusted network router stores the routes for the SDs of SD banks 124a or 124b (collectively called "SD subnets") and has a main and backup route, differentiated with metric and gateway address. Route consolidation can be performed by assigning continuous SD subnets to the same SD Banks Keepalives are sent periodically to make sure the routing table is up to date. In some embodiments, on the SD Bank, static routes are set to the SD gateways and do not require update. In some embodiments, on the train SD 126a or 126b, there are two routes to different SD banks for all wayside device through supernetting, differentiated with metric and gateway address. Keepalives are sent periodically to make sure the routing table is up to date.

On the security level, in some embodiments, two static IPSec VPN tunnels are maintained between each train SD 126a or 126b and separate SD Bank 124a or 124b. PKI in the infrastructure maintains integrity and validity of the SD nodes (e.g., on-board SDs and SDs in SD Banks) Certificate authority maintains issuance and revocation of certificates. In some embodiments, SD Banks and train SD firewall discard any packet that does not use IPSec communication, as well as devices outside of the allowed train and wayside address range.

In some embodiments, more or less than two communication tunnels are established and maintained between the SD Banks and the SDs on-board the train. In some embodiments, the communication tunnel between a train SD and a SD Bank is a communication tunnel other than a IPSec tunnel.

The Train SD

The train security device (SD) is the gateway for communication of the train devices to the wayside devices (e.g., devices of the central equipment 132, the station equipment 134, or the wayside equipment 136). In some embodiments, the train SD serves as the router, IPSec Virtual private network (VPN) device, firewall, route metric updater, and/or a multiple point switch.

In some embodiments, the train SD routes the packet to the SD bank gateway based on the latest metric information updated from the route metric updater.

In some embodiments, the train SD establishes VPN tunnels with one or multiple SD Bank gateways, and refreshes the shared secrets using Internet Security Association and Key Management Protocol (ISAKMP) and/or IPSec protocols.

In some embodiments, the train SD discards all packets that are not encapsulated in the VPN tunnels specified, or outside of IP address range within the train.

In some embodiments, the SD acts as a route metric updater and sends periodic Keepalive messages to the SD Banks to determine the status of the route, and update the metric of the route when a failure is detected. In some embodiments, typical Keepalive messages are 3-5 polls, duration of polls can be as fast as 200-500 ms.

In some embodiments, the train SD provides port access for train access devices.

The SD Bank

The SD Banks include multiple SDs and each are the gateway for communication of the train devices to the wayside devices. It serves as the router, IPSec Virtual private network (VPN) device, firewall, route metric updater, and/or multiple point switches.

In some embodiments, each SD of a SD Bank routes the packet to the SD bank gateway based on the latest metric information updated from the route metric updater.

In some embodiments, each SD of a SD Bank establishes VPN tunnels with multiple train SD gateways, and refreshes the shared secrets using ISAKMP and IPSec protocols.

In some embodiments, each SD of a SD Bank discards all packets that are not encapsulated in the VPN tunnels specified, or outside of IP address range within the train.

In some embodiments, each SD acts as a route metric updater and sends periodic Keepalive messages to the train SD and/or another SD within the same SD Bank to determine the status of the route, and update the metric of the route when a failure is detected. Typical Keepalive messages are 3-5 polls, duration of polls can be as fast as 200-500 ms.

In some embodiments, each SD of a SD Bank provides port access for wayside devices.

In some embodiments, the SD bank is implemented using a network architecture connecting one or more SDs of the SD Bank. In some embodiments, the SD Bank includes a controller that manages the operation of the one or more SDs of the SD Bank.

For example, in some embodiments, a SD Bank communicatively connecting the trusted network and the untrusted network and includes a common bus or a local network within the SD and one or more SDs connected to the common bus or the local network. In some embodiments, the SD Bank is configured to cause a first one of the SDs to send communication information to a second one of the SDs of the same SD Bank in order to update the communication information. The communication includes a route metric of the trusted network, security policy information, a digital certificate, or key exchange information.

In some embodiments, the load balancing among the SDs of the SD Bank is on a dynamic basis. In some embodiments, a first one of the SDs of the SD Bank is configured to redirect data traffic on the first one of the SDs, or a request to establish a VPN tunnel by the first one of the SDs, to a second one of the SDs. In some embodiments, the SD Bank further has a stand-alone controller configured to redirect data traffic on the first one of the SDs, or a request to establish a VPN tunnel by the first one of the SDs, to the second first one of the SDs. Based on the measured workload of a first SD of the SD Bank, represented by CPU utilization or packet counts in some embodiments, the SD bank re-directs traffic to a second SD of the SD Bank by using methods such as traffic forwarding using dedicated interface, dynamic ARP update with MAC address of the less loaded SD interface as gateway address, or distributed processing with other SD processors within the SD Bank. In some embodiments, the distribution of workload among the SDs is coordinated, via a local network connecting all the SDs of the SD Bank, by one of the SDs of the SD bank utilizing link aggregation protocols such as 802.3ad to distribute and receive load. Routes, certificates, and key exchange information are shared among SDs within the SD Bank.

In some embodiments, the load balancing among the SDs of the SD Bank is on a static basis according to predetermined workload allocation. Workload is statically allocated by defining routes and gateways to the specific SD of the SD Bank. For instance, train SD No. 1 to 10 is allocated to SD unit 1 in the SD Bank, train SD 11 to 20 to SD unit 2 in the SD Bank, etc. The interaction between individual SDs within the SD Bank is reduced (such as network update only) compared with the dynamic load balancing scheme.

Moreover, the security policy implemented in an individual SD Bank is consistent among the SDs of the same SD bank for dynamic load balancing scheme. An update of the policy will be propagated to each SD within the same SD Bank.

Keys and digital certificates are shared within the SDs of an individual SD bank for dynamic load balancing scheme. Individual keys and digital certificates are used for static load balancing scheme.

Trusted Network Routers

Trusted network routers perform at least two functions: routing of packets, and route metric updater.

The trusted network router the packet to the SD Bank gateway based on the latest metric information updated from the route metric updater.

The route metric updater send periodic Keepalive messages to the SD Banks to determine the status of the route, and update the metric of the route when a failure is detected. Typical Keepalive messages are 3-5 polls, duration of polls can be as fast as 200-500 ms.

In some embodiments, the SDs in a SD Bank is implemented using the same hardware as the train to reduce hardware, firmware, and software maintenance cost. The router can be any standard environmentally rated router that supports route tracing function. Alternatives to the implementation include Commercial Off-The-Shelf (COTS) based train or wayside SDs as long as the functions can be programmed.

On the software perspective, there are many implementation of IPSec that could be considered using general purpose processor, e.g. Linux, OpenBSD, windows, QNX. Other options such as security encryption accelerator based on embedded processor or dedicated hardware are also possible alternatives.

The present disclosure combines Keepalives of routing into IPSec to achieve high availability and deterministic failure mode. The present disclosure also describes an IP assignment scheme to minimize routes and tunnels in train and SD Banks Also, in some embodiments, static route assignment is used to achieve scalability. Utilization of available or pre-verified hardware (i.e., adding SDs in a SD bank instead of verifying a new SD with increased communication capacity) to deploy security solution suitable for train control.

Figure 2:
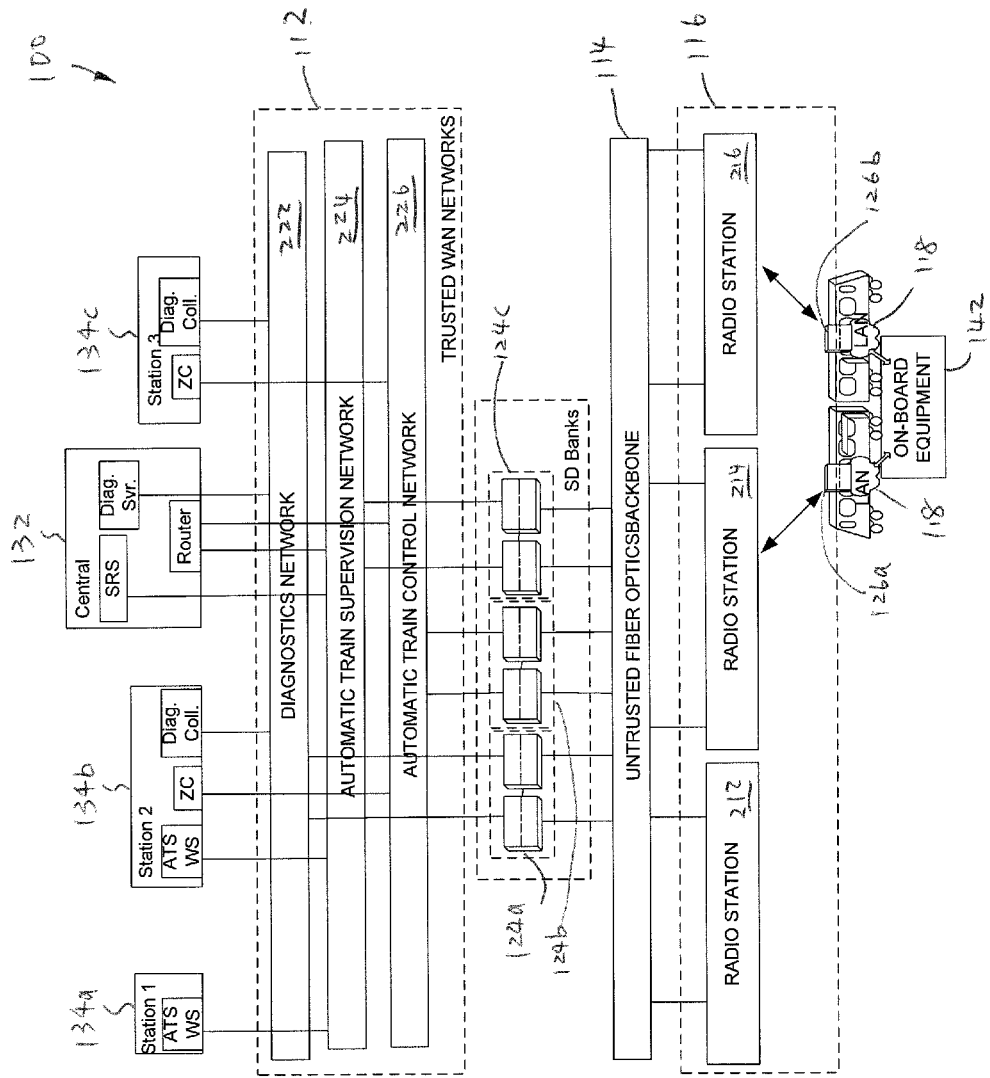
FIG. 2 is a functional block diagram of a CBTC system in accordance with one or more embodiments.

FIG. 2 is a functional block diagram of a CBTC system 100 in accordance with one or more embodiments. Three SD Banks 124a, 124b, and 124c and three different station equipment 134a, 134b, and 134c are depicted in FIG. 2. In addition, the mobile network 116 includes a plurality of radio stations 212, 214, and 216 along the tracks and radio stations on-board the train. The station equipment 134a includes an automatic train supervision work station (ATS WS). The station equipment 134b includes an ATS WS, a zone controller (ZC), and a Diagnostics Collector (Diag. Coll.). The station equipment 134c includes a ZC and a Diag. Coll. The central equipment 132 includes a router, a System Regulation Server (SRS), and a Diagnostics Server (Diag. Syr.).

Figure 3A:
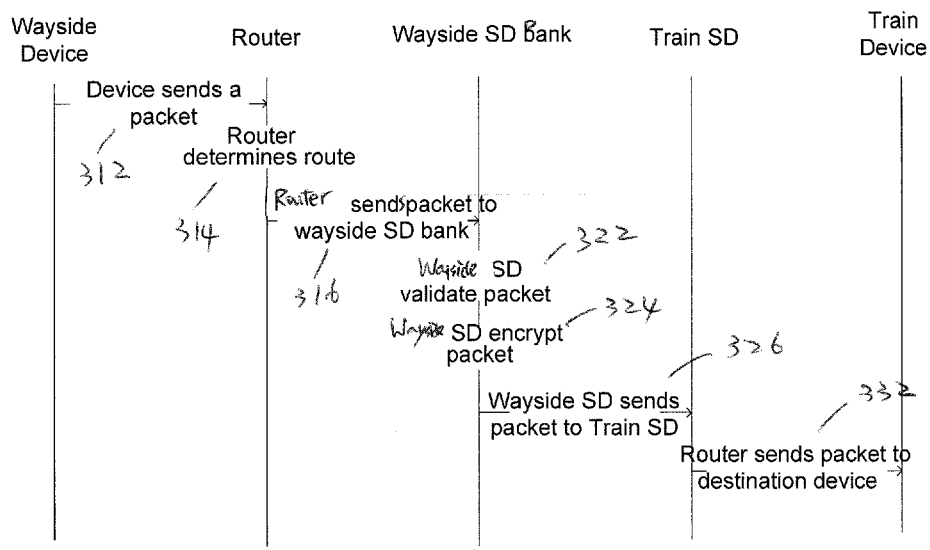
FIG. 3A and FIG. 3B are timing diagrams of communicating from a wayside device to a train device and from a train device to a wayside device in accordance with one or more embodiments.

The trusted network 112 includes a diagnostics network 222, an automatic train supervision network 224, and an automatic train control network 226, which are logically and/or physically separated networks for the purpose of data traffic of different nature and behavior. The separation provides guarantee that the data traffic will not impact each other. For example, the diagnostics network 222 is used to handle data traffic to/from Diag. Coll. and Diag. Srv.; the automatic train supervision network 224 is used to handle data traffic to/from router, ATSWS, and SRS; and the automatic train control network 226 is used to handle data traffic to/from router and ZCs. As depicted in FIG. 2, each network 222, 224, and 226 are assigned to different SD Banks 124a, 124b, and 124c. However, in some embodiments, two or more of networks 222, 224, and 226 share one or more common SD Banks FIG. 3A is a timing diagram of communicating from a wayside device to a train device in accordance with one or more embodiments. It is understood that additional operations may be performed before, during, and/or after the diagram depicted in FIG. 3A, and that some other operations may only be briefly described herein.

In operation 312, the wayside device (such as a device of central equipment 132, station equipment 134, and wayside equipment 136 in FIGS. 1 and 2) sends a packet to a router within the trusted network 112. In operation 314, the router determines a route for sending the packet to one of the SD Banks through the trusted network. In operation 316, the router sends the packet to the one of the SD Banks along the determined route.

In operation 322, the wayside SD Bank receives the data packet and select one of the SDs of the SD Bank based on predetermined workload allocation or measured workload of the SDs, or if there is a pre-existing VPN tunnel to the train SD, to handle the received data packet. The selected SD validates the packet to determine if the packet is routed along a predetermined route or in consistent with a set of predetermined routing rules. In operation 324, the selected SD encrypts the packet. In operation 326, the selected SD sends the encrypted packet to a train SD via the untrusted network.

In operation 332, the train SD decrypts the received packet and sends the packet to the destination train device. The handshaking, the encryption, and/or the decryption of the data packet is also referred to as establishing, transmitting, and/or receiving data traffic using a VPN tunnel through the untrusted network between the selected SD of the SD Bank and the train SD.

Figure 3B:
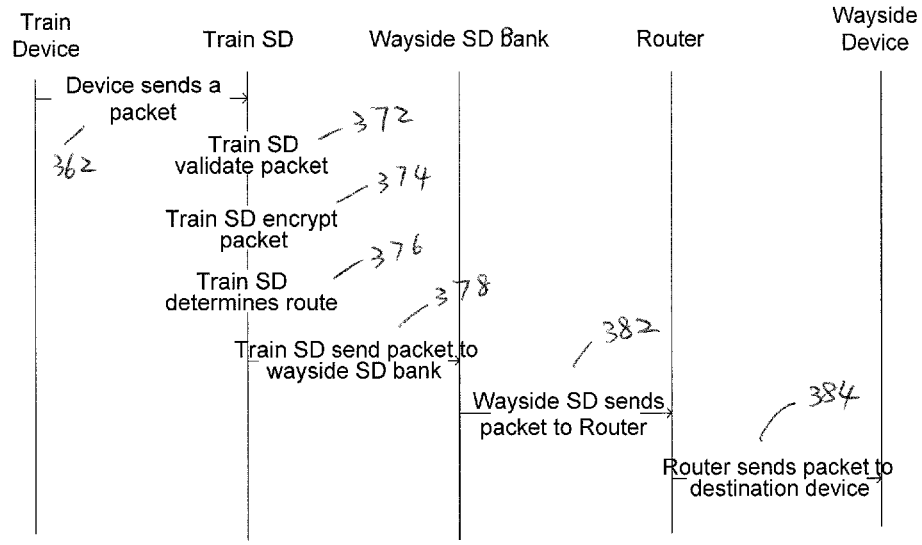

FIG. 3B is a timing diagram of communicating from a train device to a wayside device in accordance with one or more embodiments. It is understood that additional operations may be performed before, during, and/or after the diagram depicted in FIG. 3B, and that some other operations may only be briefly described herein.

In operation 362, the train device sends a packet to a SD on-board the train (i.e., the "train SD"). In operation 372, the train SD validates the packet. In operation 374, the train SD encrypts the packet. In operation 376, the train SD determines a route for sending a packet via one of the SD Banks to a destination wayside device. In operation 378, the train SD sends the encrypted packet to the one of the SD Banks.

In operation 382, the one of the SD Banks select one of SDs of the SD Bank according to workload allocation or measured workload of the SDs, or if there is a pre-existing VPN tunnel to the train SD, to handle the received data packet. The selected SD decrypts the packet and sends the decrypted packet to a router. In operation 384, the router sends the packet to the destination wayside device along the determined route.

Figure 4:
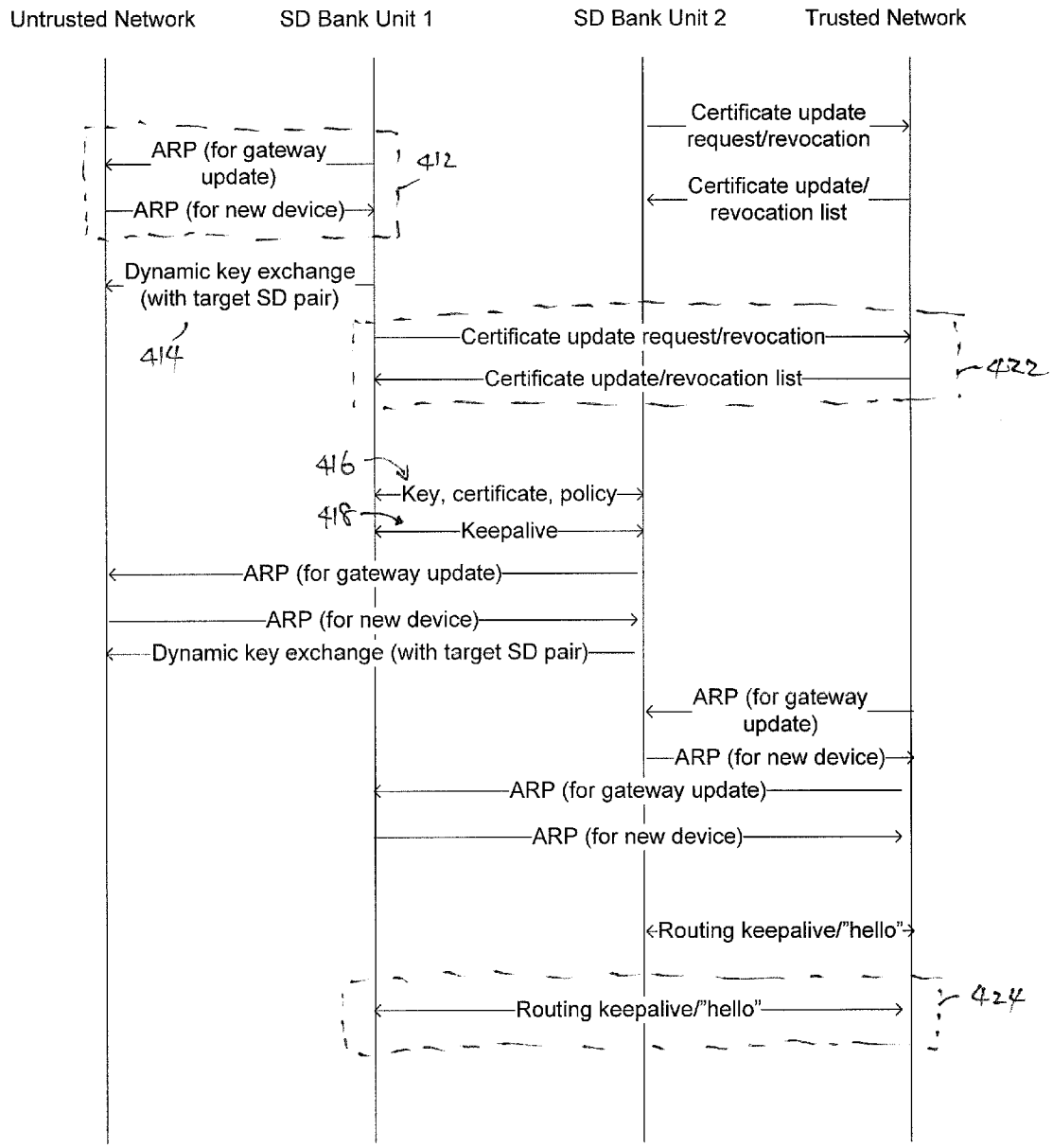
FIG. 4 is a timing diagram of communication among a trusted network, an untrusted network, and two security devices (SDs) of a SD Bank in accordance with one or more embodiments.

FIG. 4 is a timing diagram of communication among a trusted network, an untrusted network, and two security devices (SDs) of a SD Bank in accordance with one or more embodiments. In some embodiments, the SDs of the SD Bank are connected to a common bus or a local network within the SD Bank.

One of the SDs of the SD Bank sends periodic address resolution protocol (ARP) messages to the untrusted network to update its gateway information. The untrusted network also provides ARP for new devices (operation 412). The SD also communicates with other train SDs via the untrusted network to negotiate key exchange information (operation 414). The SD shares certificate, key, and policy with other SD(s) of the SD bank (operation 416) and runs a protocol to monitor the health of the other SD(s) of the SD bank (operation 418).

Further, the SD requests, revokes and update certificate information from the certificate authority via the trusted network (operation 422). The SD also responds to routing Keepalive on the trusted network (operation 422).

As depicted in FIG. 4, the other SD (SD Bank unit 2) of the SD Bank is capable of individually perform all the operations described above.

Figure 5:
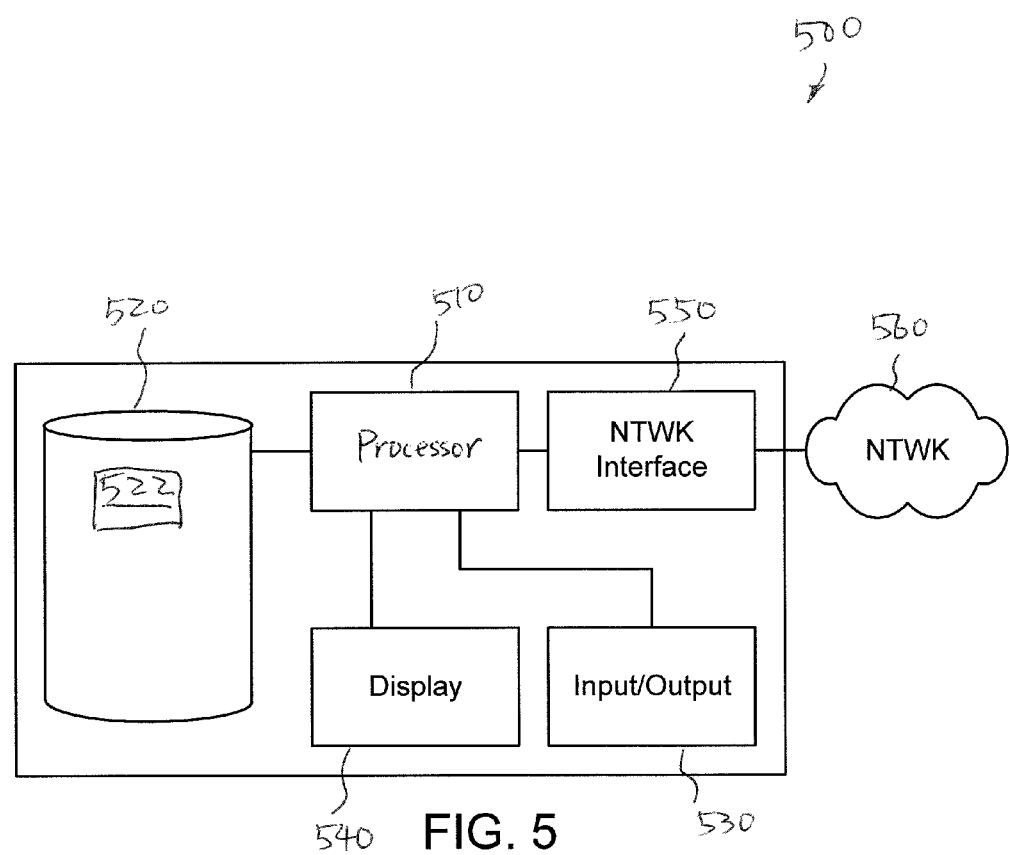
FIG. 5 is a functional block diagram of a computer system usable for implementing the SD or the SD Bank in accordance with one or more embodiments.

FIG. 5 is a functional block diagram of a computer system 500 usable for implementing the SD and/or the SD Bank in accordance with one or more embodiments. Computer system 500 includes the hardware processor 510 and a non-transitory, computer readable storage medium 520 encoded with, i.e., storing, the computer program code 522, i.e., a set of executable instructions. The processor 510 is electrically coupled to the computer readable storage medium 520. The processor 510 is configured to execute the computer program code 522 encoded in the computer readable storage medium 520 in order to cause the computer 500 to be usable as a SD or a controller for managing SDs in a SD Bank.

In some embodiments, the processor 510 is a central processing unit (CPU), a multi-processor, a distributed processing system, an application specific integrated circuit (ASIC), and/or a suitable processing unit.

In some embodiments, the computer readable storage medium 520 is an electronic, magnetic, optical, electromagnetic, infrared, and/or a semiconductor system (or apparatus or device). For example, the computer readable storage medium 520 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 520 includes a compact disk-read only memory (CD-ROM), a compact disk-read/write (CD-R/W), and/or a digital video disc (DVD).

The computer system 500 includes, in at least some embodiments, an input/output interface 530 and a display interface 540. The input/output interface 530 is coupled to the processor 510 and allows a data communication system engineer to adjust the setting of the SD or the controller of SDs in a SD Bank. In at least some embodiments, the display interface 540 outputs the operation of the computer system 500 to an external display unit. In at least some embodiments, the input/output interface 530 and the display interface 540 allow an operator to operate the computer system 500 in an interactive manner. In at least one embodiment, the display interface is omitted.

In at least some embodiments, the computer system 500 also includes a network interface 550 coupled to the processor 510. The network interface 550 allows the computer system 500 to communicate with a network 560, to which one or more other computer systems are connected. The network interface includes wireless network interfaces such as BLUETOOTH, WIFI, WIMAX, GPRS, or WCDMA; or wired network interface such as ETHERNET, USB, or IEEE-1394.

In accordance with an embodiment, a system a system includes a trusted network, an untrusted network, on-board equipment on-board a moving object, one or more first security devices on-board the moving object and communicatively connecting the on-board equipment and the untrusted network, and a security device bank communicatively connecting the trusted network and the untrusted network. The security device bank includes a common bus or the local network and one or more second security devices connected to the common bus or the local network.

In accordance with another embodiment, a security device bank is configured to connect a trusted network and an untrusted network. The security device bank includes a common bus or a local network, and one or more security devices connected to the common bus or the local network.

In accordance with another embodiment, a method of data communication using a security device bank includes receiving a data packet from a first device through a trusted network. The security device bank selects one of one or more of security rity devices of the security device bank based on predetermined workload allocation or measured workload of the one or more of security devices of the security device bank. The data packet is transmitted to a second device through an untrusted network by using a virtual private network (VPN) tunnel established by the one of one or more of security devices of the security device bank.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
    a trusted network;
    an untrusted network;
    on-board equipment on-board a movable object;
    off-board equipment comprising wayside equipment, central equipment, and station equipment, the off-board equipment being communicatively coupled with the trusted network;
    one or more first security devices on-board the movable object and communicatively connecting the on-board equipment and the untrusted network; and
    a security device bank communicatively connecting the trusted network and the untrusted network, the security device bank comprising:
        a common bus or a local network; and
        one or more second security devices connected to the common bus or the local network,
    wherein
        each second security device of the one or more second security devices is configured to establish a predefined quantity of communication tunnels through the untrusted network between the security device bank and the one or more first security devices,
        the communication tunnels are in compliance with an Internet Engineering Task Force (IETF®) Internet Protocol Security (IPsec) standard,
        the security device bank is configured to be scalable to increase a communication capacity of the security device bank by adding one or more additional second security devices to the security device bank, the one or more additional security devices being connected to the common bus or the local network,
        the one or more second security devices included in the security device bank are verified components of the system,
        the one or more second security devices are configured to cause the one or more additional second security devices to be the verified components of the system based on the one or more additional second security devices being connected to the common bus or the local network,
        all of the off-board equipment is communicatively coupled with the untrusted network through only the security device bank, and
        all of the off-board equipment is communicatively coupled with one another through the trusted network independent of the security device bank.

2. The system of claim 1, wherein at least one of the communication tunnels established by the one or more second security devices is a virtual private network (VPN) tunnel through the untrusted network.

3. The system of claim 1, wherein the communication tunnels established by the one or more second security devices comprise multiple VPN tunnels through the untrusted network.

4. The system of claim 1, wherein the security device bank is a first security device bank, and the system further comprises a second security device bank communicatively connecting the trusted network and the untrusted network, wherein
    the communication tunnels established by the one or more second security devices of the first security device bank comprise at least one VPN tunnel communicatively connecting the first security bank with the one or more first security devices through the untrusted network, and
    the second security device bank and the one or more first security devices are configured to establish a separate VPN tunnel communicatively connecting the second security bank with the one or more first security devices through the untrusted network.

5. The system of claim 1, wherein the communication tunnels established by the one or more second security devices are VPN tunnels.

6. The system of claim 1, further comprising stationary equipment communicatively connected to the trusted network, wherein the trusted network is configured to establish communication between the stationary equipment and the security device bank by static routing and keep-alive polling.

7. The system of claim 1, wherein the one or more second security devices are configured to share communication information with one another inside the security device bank to cause the one or more additional security devices to be the verified components of the system.

8. The system of claim 7, wherein the communication information comprises security policy information propagated to the one or more second security devices included in the security device bank and one or more additional second security devices added to the security device bank via the common bus or the local network.

9. The system of claim 1, wherein a first one of the one or more second security devices is configured to redirect (1) data traffic on the first one of the one or more second security devices, or (2) a request to establish a VPN tunnel by the first one of the one or more second security devices, to a second one of the one or more second security devices.

10. The system of claim 1, wherein the security device bank further comprises a stand-alone controller configured to redirect (1) data traffic on a first one of the one or more second security devices, or (2) a request to establish a VPN tunnel by the first one of the one or more second security devices, to a second one of the one or more second security devices.

11. The system of claim 1, wherein the one or more additional second security devices are verified components of the system based only on the inclusion of the one or more additional second security devices in the security device bank.

12. The system of claim 1, wherein a quantity of the additional second security devices is based on a quantity of wayside equipment included in the off-board equipment.

13. A security device bank configured to connect a trusted network and an untrusted network, the security device bank comprising:
    a common bus or a local network; and
    one or more off-board security devices connected to the common bus or the local network,
    wherein
        each off-board security device of the one or more off-board security devices is configured to establish a predefined quantity of communication tunnels through the untrusted network between the security device bank and one or more on-board security devices aboard a movable vehicle, the communication tunnels are in compliance with an Internet Engineering Task Force (IETF®) Internet Protocol Security (IPsec) standard, the security device bank is configured to be scalable to increase a communication capacity of the security device bank by adding one or more additional off-board security devices to the security device bank, the one or more additional off-board security devices being connected to the common bus or the local network, the one or more off-board security devices included in the security device bank are verified components of a vehicle control system, the one or more off-board security devices are configured to cause the one or more additional off-board security devices to be the verified components of the vehicle control system based on the one or more additional off-board security devices being connected to the common bus or the local network, the vehicle control system comprises off-board equipment comprising wayside equipment, central equipment, and station equipment, the off-board equipment is communicatively coupled with the trusted network to communicate with one another through the trusted network independent of the security device bank, and the security device bank is configured to communicatively couple all of the off-board equipment with the untrusted network through only the security device bank.

14. The security device bank of claim 13, wherein at least one of the communication tunnels established by the one or more off-board security devices is a virtual private network (VPN) tunnel through the untrusted network.

15. The security device bank of claim 13, wherein the communication tunnels established by the one or more off-board security devices are VPN tunnels.

16. The security device bank of claim 13, wherein a first one of the one or more off-board security devices is configured to send communication information to a second one of the one or more off-board security devices and to the one or more additional off-board security devices via the common bus or the local network.

17. The security device bank of claim 16, wherein the communication information comprises security policy information.

18. The security device bank of claim 13, wherein a first one of the one or more off-board security devices is configured to redirect (1) data traffic on the first one of the one or more off-board security devices, or (2) a request to establish a VPN tunnel by the first one of the one or more off-board security devices, to a second one of the one or more off-board security devices.

19. The security device bank of claim 13, further comprising a stand-alone controller configured to redirect (1) data traffic on a first one of the one or more off-board security devices, or (2) a request to establish a VPN tunnel by the first one of the one or more off-board security devices, to a second one of the one or more off-board security devices.

20. A method comprising:
communicating a data packet from a first device to a security device bank through a trusted network, wherein the security device bank comprises one or more security devices, the first device is one device of a plurality of devices included in an off-board equipment network comprising wayside equipment, central equipment, and station equipment, and the plurality of devices of the off-board equipment network are communicatively coupled with one another through the trusted network;

selecting, by the security device bank, one of the one or more of security devices of the security device bank based on predetermined workload allocation or a measured workload of the one or more of security devices of the security device bank;

transmitting the data packet to a second device through an untrusted network by using a virtual private network (VPN) tunnel, wherein a predefined quantity of VPN tunnels are established by the selected one of the one or more of security devices of the security device bank in compliance with an Internet Engineering Task Force (IETF®) Internet Protocol Security (IPsec) standard, wherein the second device is one device of a plurality of devices included in an on-board equipment aboard a movable vehicle, increasing a communication capacity of the security device bank by physically adding one or more additional security devices to the security device bank, increasing a total quantity of VPN tunnels capable of being established by the security devices included in the security device bank;

propagating a security policy establishing the security devices included in the security device bank as verified components of a vehicle control system to the one or more additional security devices; and verifying the one or more additional security devices based on the inclusion of the one or more additional security devices in the security device bank, wherein
all of the off-board equipment is communicatively coupled with the untrusted network through only the security device bank, and
all of the off-board equipment is communicatively coupled with one another through the trusted network independent of the security device bank.

* * * * *

UNITED STATES PATENT AND TRADEMARK OFFICE
CERTIFICATE OF CORRECTION

PATENT NO. : 9,166,952 B2
APPLICATION NO. : 13/837012
DATED : October 20, 2015
INVENTOR(S) : Siu It is certified that error appears in the above-identified patent and that said Letters Patent is hereby corrected as shown below:

Column 9, line 17 - Column 12, line 52, delete claims 1-20 and substitute therefore with the following claims 1-20:

1. A system, comprising:

a trusted network;

an untrusted network;

on-board equipment on-board a movable object;

off-board equipment comprising wayside equipment, central equipment, and station equipment, the off-board equipment being communicatively coupled with the trusted network;

one or more first security devices on-board the movable object and communicatively connecting the on-board equipment and the untrusted network; and a security device bank communicatively connecting the trusted network and the untrusted network, the security device bank comprising:

a common bus or a local network; and

Signed and Sealed this
Fifth Day of April, 2016

Michelle K. Lee
*Director of the United States Patent and Trademark Office* one or more second security devices connected to the common bus or the local network, wherein each second security device of the one or more second security devices is configured to establish a predefined quantity of communication tunnels through the untrusted network between the security device bank and the one or more first security devices, the communication tunnels are in compliance with an Internet Engineering Task Force (IETF®) Internet Protocol Security (IPsec) standard, the security device bank is configured to be scalable to increase a communication capacity of the security device bank by adding one or more additional second security devices to the security device bank, the one or more additional security devices being connected to the common bus or the local network, the one or more second security devices included in the security device bank are verified components of the system, the one or more second security devices are configured to cause the one or more additional second security devices to be the verified components of the system based on the one or more additional second security devices being connected to the common bus or the local network, all of the off-board equipment is communicatively coupled with the untrusted network through only the security device bank, and all of the off-board equipment is communicatively coupled with one another through the trusted network independent of the security device bank.

2. The system of claim 1, wherein at least one of the communication tunnels established by the one or more second security devices is a virtual private network (VPN) tunnel through the untrusted network.

3. The system of claim 1, wherein the communication tunnels established by the one or more second security devices comprise multiple VPN tunnels through the untrusted network.

4. The system of claim 1, wherein the security device bank is a first security device bank, and the system further comprises a second security device bank communicatively connecting the trusted network and the untrusted network, wherein the communication tunnels established by the one or more second security devices of the first security device bank comprise at least one VPN tunnel communicatively connecting the first security bank with the one or more first security devices through the untrusted network, and the second security device bank and the one or more first security devices are configured to establish a separate VPN tunnel communicatively connecting the second security bank with the one or more first security devices through the untrusted network.

5. The system of claim 1, wherein the communication tunnels established by the one or more second security devices are VPN tunnels.

6. The system of claim 1, further comprising stationary equipment communicatively connected to the trusted network, wherein the trusted network is configured to establish communication between the stationary equipment and the security device bank by static routing and keep-alive polling.

7. The system of claim 1, wherein the one or more second security devices are configured to share communication information with one another inside the security device bank to cause the one or more additional security devices to be the verified components of the system.

8. The system of claim 7, wherein the communication information comprises security policy information propagated to the one or more second security devices included in the security device bank and one or more additional second security devices added to the security device bank via the common bus or the local network.

9. The system of claim 1, wherein a first one of the one or more second security devices is configured to redirect (1) data traffic on the first one of the one or more second security devices, or (2) a request to establish a VPN tunnel by the first one of the one or more second security devices, to a second one of the one or more second security devices.

10. The system of claim 1, wherein the security device bank further comprises a stand-alone controller configured to redirect (1) data traffic on a first one of the one or more second security devices, or (2) a request to establish a VPN tunnel by the first one of the one or more second security devices, to a second one of the one or more second security devices.

11. A security device bank configured to connect a trusted network and an untrusted network, the security device bank comprising:

a common bus or a local network; and one or more off-board security devices connected to the common bus or the local network, wherein each off-board security device of the one or more off-board security devices is configured to establish a predefined quantity of communication tunnels through the untrusted network between the security device bank and one or more on-board security devices aboard a movable vehicle, the communication tunnels are in compliance with an Internet Engineering Task Force (IETF®) Internet Protocol Security (IPsec) standard, the security device bank is configured to be scalable to increase a communication capacity of the security device bank by adding one or more additional off-board security devices to the security device bank, the one or more additional off-board security devices being connected to the common bus or the local network, the one or more off-board security devices included in the security device bank are verified components of a vehicle control system, the one or more off-board security devices are configured to cause the one or more additional off-board security devices to be the verified components of the vehicle control system based on the one or more additional off-board security devices being connected to the common bus or the local network, the vehicle control system comprises off-board equipment comprising wayside equipment, central equipment, and station equipment, the off-board equipment is communicatively coupled with the trusted network to communicate with one another through the trusted network independent of the security device bank, and the security device bank is configured to communicatively couple all of the off-board equipment with the untrusted network through only the security device bank.

12. The security device bank of claim 11, wherein at least one of the communication tunnels established by the one or more off-board security devices is a virtual private network (VPN) tunnel through the untrusted network.

13. The security device bank of claim 11, wherein the communication tunnels established by the one or more off-board security devices are VPN tunnels.

14. The security device bank of claim 11, wherein a first one of the one or more off-board security devices is configured to send communication information to a second one of the one or more off-board security devices and to the one or more additional off-board security devices via the common bus or the local network.

15. The security device bank of claim 14, wherein the communication information security policy information.

16. The security device bank of claim 11, wherein a first one of the one or more off-board security devices is configured to redirect (1) data traffic on the first one of the one or more off-board security devices, or (2) a request to establish a VPN tunnel by the first one of the one or more off-board security devices, to a second one of the one or more off-board security devices.

17. The security device bank of claim 11, further comprising a stand-alone controller configured to redirect (1) data traffic on a first one of the one or more off-board security devices, or (2) a request to establish a VPN tunnel by the first one of the one or more off-board security devices, to a second one of the one or more off-board security devices.

18. A method comprising:

communicating a data packet from a first device to a security device bank through a trusted network, wherein the security device bank comprises one or more security devices, the first device is one device of a plurality of devices included in an off-board equipment network comprising wayside equipment, central equipment, and station equipment, and the plurality of devices of the off-board equipment network are communicatively coupled with one another through the trusted network;

selecting, by the security device bank, one of the one or more of security devices of the security device bank based on predetermined workload allocation or a measured workload of the one or more of security devices of the security device bank;

transmitting the data packet to a second device through an untrusted network by using a virtual private network (VPN) tunnel, wherein a predefined quantity of VPN tunnels are established by the selected one of the one or more of security devices of the security device bank in compliance with an Internet Engineering Task Force (IETF®) Internet Protocol Security (IPsec) standard, wherein the second device is one device of a plurality of devices included in an on-board equipment aboard a movable vehicle, increasing a communication capacity of the security device bank by physically adding one or more additional security devices to the security device bank, increasing a total quantity of VPN tunnels capable of being established by the security devices included in the security device bank;

propagating a security policy establishing the security devices included in the security device bank as verified components of a vehicle control system to the one or more additional security devices; and verifying the one or more additional security devices based on the inclusion of the one or more additional security devices in the security device bank, wherein
all of the off-board equipment is communicatively coupled with the untrusted network through only the security device bank, and
all of the off-board equipment is communicatively coupled with one another through the trusted network independent of the security device bank.

19. The system of claim 1, wherein the one or more additional second security devices are verified components of the system based only on the inclusion of the one or more additional second security devices in the security device bank.

20. The system of claim 1, wherein a quantity of the additional second security devices is based on a quantity of wayside equipment included in the off-board equipment.